(12) United States Patent
Park et al.

(10) Patent No.: US 12,355,294 B2
(45) Date of Patent: Jul. 8, 2025

(54) CHARGING DEVICE

(71) Applicants: Hyundai Motor Company, Seoul (KR); Kia Corporation, Seoul (KR)

(72) Inventors: Junho Park, Cheongju-si (KR); Semin Woo, Seoul (KR); Seunghyun Han, Suwon-si (KR); Changhan Jun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 655 days.

(21) Appl. No.: 17/830,465

(22) Filed: Jun. 2, 2022

(65) Prior Publication Data

US 2023/0027005 A1 Jan. 26, 2023

(30) Foreign Application Priority Data

Jul. 22, 2021 (KR) .................. 10-2021-0096143

(51) Int. Cl.
| | |
|---|---|
| *H02J 7/00* | (2006.01) |
| *H02J 7/06* | (2006.01) |
| *H02M 1/42* | (2007.01) |
| *H02M 1/44* | (2007.01) |
| *H02M 3/00* | (2006.01) |
| *H02M 3/335* | (2006.01) |

(52) U.S. Cl.
CPC ............ *H02J 7/06* (2013.01); *H02M 1/4233* (2013.01); *H02M 1/44* (2013.01); *H02M 3/01* (2021.05); *H02M 3/33573* (2021.05); *H02M 3/33584* (2013.01); *H02J 2207/20* (2020.01)

(58) Field of Classification Search
CPC .. H02J 7/06; H02J 2207/20; H02J 7/02; H02J 7/04; H02M 1/4233; H02M 1/44; H02M 3/01; H02M 3/33573; H02M 3/33584; H02M 1/007; H02M 7/219; H02M 1/0043; H02M 1/0064; H02M 1/4225; H02M 7/5387; B60L 53/22; B60L 2270/147; B60L 53/24; B60L 53/14; Y02T 10/70; Y02T 10/7072; Y02T 90/14; B60Y 2200/91
USPC ....................................................... 320/109
See application file for complete search history.

(56) References Cited

U.S. PATENT DOCUMENTS

| | | | |
|---|---|---|---|
| 2023/0103028 A1* | 3/2023 | Zou .......................... | H02J 7/02 320/107 |
| 2023/0211686 A1* | 7/2023 | Smolenaers ............ | H02J 3/322 320/109 |

FOREIGN PATENT DOCUMENTS

JP 2017121174 A 7/2017

\* cited by examiner

*Primary Examiner* — Paul Dinh
(74) *Attorney, Agent, or Firm* — Slater Matsil, LLP

(57) ABSTRACT

An embodiment charging device includes a power factor correction circuit first to third switch legs connected to first to third inductors, respectively, a relay network for controlling connection between the first to third inductors and first to third input terminals according to a phase of a power grid connected to the first to third input terminals, a relay control circuit connected to the first to third input terminals for sensing one of the first to third input terminals to which a power source is connected and controlling the relay network based on a sensing result, and a relay filter circuit including first to third filter capacitors connected between a ground plane and first to third sensing lines connected to the relay control circuit for sensing voltages of the first to third input terminals and a fourth filter capacitor connected between the ground plane and a chassis.

20 Claims, 15 Drawing Sheets

CHARGING DEVICE

CROSS-REFERENCE TO RELATED APPLICATIONS

This application claims the benefit of Korean Patent Application No. 10-2021-0096143, filed on Jul. 22, 2021, which application is hereby incorporated herein by reference.

TECHNICAL FIELD

The present disclosure relates to a charging device.

BACKGROUND

Electronic devices connected to an AC power grid must satisfy an electromagnetic interference (EMI) level below a predetermined level in a specific frequency band to maintain quality of a power grid (regulation: ECE-R10). Therefore, it is essential to develop a filter to suppress the EMI emitted from the noise source, as a power-semiconductor in electronic device design to AC power grid.

Among electronic devices, a charging device for a high voltage battery for driving an electric vehicle receives commercial AC power to convert it into a voltage required by the battery. When the charging device may be mounted inside the vehicle, it is called an on board charger (OBC). When a relay is applied to the charging device, relay power/signal noise for controlling turning on or off of the relay and noise of a sensing line for controlling the relay are also emitted to an AC power line by a parasitic capacitance.

Since the above two noises do not pass through an existing filter circuit, there is a limit to suppressing noise by improving performance of filter elements such as a CM-choke and an X-capacitor.

The above information disclosed in this background section is only for enhancement of understanding of the background of the invention, and therefore it may contain information that does not form the prior art that is already known to a person of ordinary skill in the art.

SUMMARY

Embodiments of the present invention provide a charging device that may minimize a noise generated by a relay applied to the charging device.

An embodiment of the present invention provides a charging device including a power factor correction (PFC) circuit that includes first to third inductors and first to third switch legs connected to the first to third inductors, respectively, a relay network that controls connection between the first to third inductors and first to third input terminals according to a phase of a power grid connected to the first to third input terminals, a relay control circuit that is connected to the first to third input terminals to sense one of the first to third input terminals to which a power source is connected and controls the relay network, a relay filter circuit that includes first to third filter capacitors connected between a ground plane, first to third sensing lines connected to the relay control circuit to sense voltages of the first to third input terminals, and a fourth filter capacitor connected between the ground plane and a chassis.

The relay network may further include a first relay including one end connected to the first input terminal and the first inductor and the other end connected to the second input terminal and the second inductor, a second relay connected between the second input terminal and the second inductor, a third relay connected between the third input terminal and the third inductor, a fourth relay connected between a neutral point with respect to the first to third input terminals and the third inductor, and a fifth relay connected in parallel to the third inductor.

The relay filter circuit may further include a fifth filter capacitor and a sixth filter capacitor respectively connected between the ground plane, a first power line connected between the relay control circuit and at least one of the first to fifth relays, and a first control line, and a power voltage may be supplied to the at least one relay through the first power line, while a relay control signal controlling an operation of the at least one relay may be supplied through the first control line.

When the first to third input terminals are connected to respective phases of a three-phase power source, the relay network may connect each of the phases of the three-phase power source to a corresponding one of the first to third switch legs, and the PFC circuit may operate as a three-phase boost PFC, and when a single-phase power source is connected to one of the first to third input terminals, the relay network may connect the single-phase power source to the first and second switch legs and connect the third switch leg to a neutral point, and the PFC circuit may operate as a single inductor type of interleaved single-phase full-bridge PFC.

When the first to third input terminals are connected to respective phases of the three-phase power source, the first relay, the fourth relay, and the fifth relay may be turned off, and the second relay and the third relay may be turned on.

When a single-phase power source is connected to the first input terminal, the first relay, the fourth relay, and the fifth relay may be turned on, and the second relay and the third relay may be turned off.

The charging device may further include a power converting circuit connected between the PFC circuit and the battery and transmitting power from the PFC circuit to the battery.

The first switch leg may include a first switch connected between the first inductor and a first input terminal of the power converting circuit and a second switch connected between the first inductor and a second input terminal of the power converting circuit, the second switch leg may include a third switch connected between the second inductor and a first input terminal of the power converting circuit and a fourth switch connected between the second inductor and a second input terminal of the power converting circuit, and the third switch leg may include a fifth switch connected between the third inductor and a first input terminal of the power converting circuit and a sixth switch connected between the third inductor and a second input terminal of the power converting circuit.

When a single-phase power source is connected to the first input terminal, the first relay, the fourth relay, and the fifth relay may be turned on, and the second relay and the third relay may be turned off, during a period in which the single-phase power supply is a positive voltage, a period in which the first switch, the third switch, and the sixth switch are turned on and a period in which the second switch, the fourth switch, and the sixth switch are turned on are repeated, and during a period in which the single-phase power supply is a negative voltage, a period in which the second switch, the fourth switch, and the fifth switch are turned on and a period in which the first switch, the third switch, and the fifth switch may be turned on are repeated.

The relay network may further include a sixth relay connected in parallel to a resistor connected between the first input terminal and the first inductor, and the charging device may turn on the sixth relay after a peak of a voltage inputted to the PFC circuit.

When the first to third input terminals are connected to respective phases of a three-phase load, the relay network may connect each of the phases of the three-phase power source to a corresponding one of the first to third switch legs, and the PFC circuit may operate as a three-phase inverter, and when a single-phase load is connected to one of the first to third input terminals, the relay network may connect the single-phase load to the first and second switch legs and connect the third switch leg to a neutral point, and the PFC circuit may operate as a single-phase inverter.

When the first to third input terminals are connected to respective phases of the three-phase load, the first relay, the fourth relay, and the fifth relay may be turned off, and the second relay and the third relay may be turned on.

When a single-phase load is connected to the first input terminal, the first relay, the fourth relay, and the fifth relay may be turned on, and the second relay and the third relay may be turned off.

The relay control circuit may further include a relay control circuit that senses an input terminal to which a load is connected among the first to third input terminals and that controls the relay network.

The charging device may further include a power converting circuit that is connected between the PFC circuit and the battery and transmits power from the battery to the PFC circuit.

When a single-phase load may be connected to the first input terminal, the first relay, the fourth relay, and the fifth relay may be turned on, and the second relay and the third relay may be turned off, the first switch and the second switch may be alternately switched, the third switch and the fourth switch may be alternately switched, an on period of the fourth switch may entirely overlap an on period of the first switch, and an on period of the second switch may entirely overlap an on period of the third switch, and the fifth switch may be turned off, and the sixth switch may be turned on.

The relay control circuit may include a sensing part that senses voltages of the first to third input terminals through the first to third sensing lines and that generates three sensing signals indicating the sensed voltage, a controller that receives the three sensing signals, determines a phase of a power system connected to the first to third input terminals, and generates a phase sensing signal indicating the determined phase, a power supplier that supplies a power voltage to the relay network according to the phase sensing signal, and a switching driver that supplies a relay control signal to the relay network according to the phase sensing signal.

According to the embodiments of the present invention, it is possible to provide a charging device that may minimize a noise generated by a relay applied to the charging device.

Figure 1:
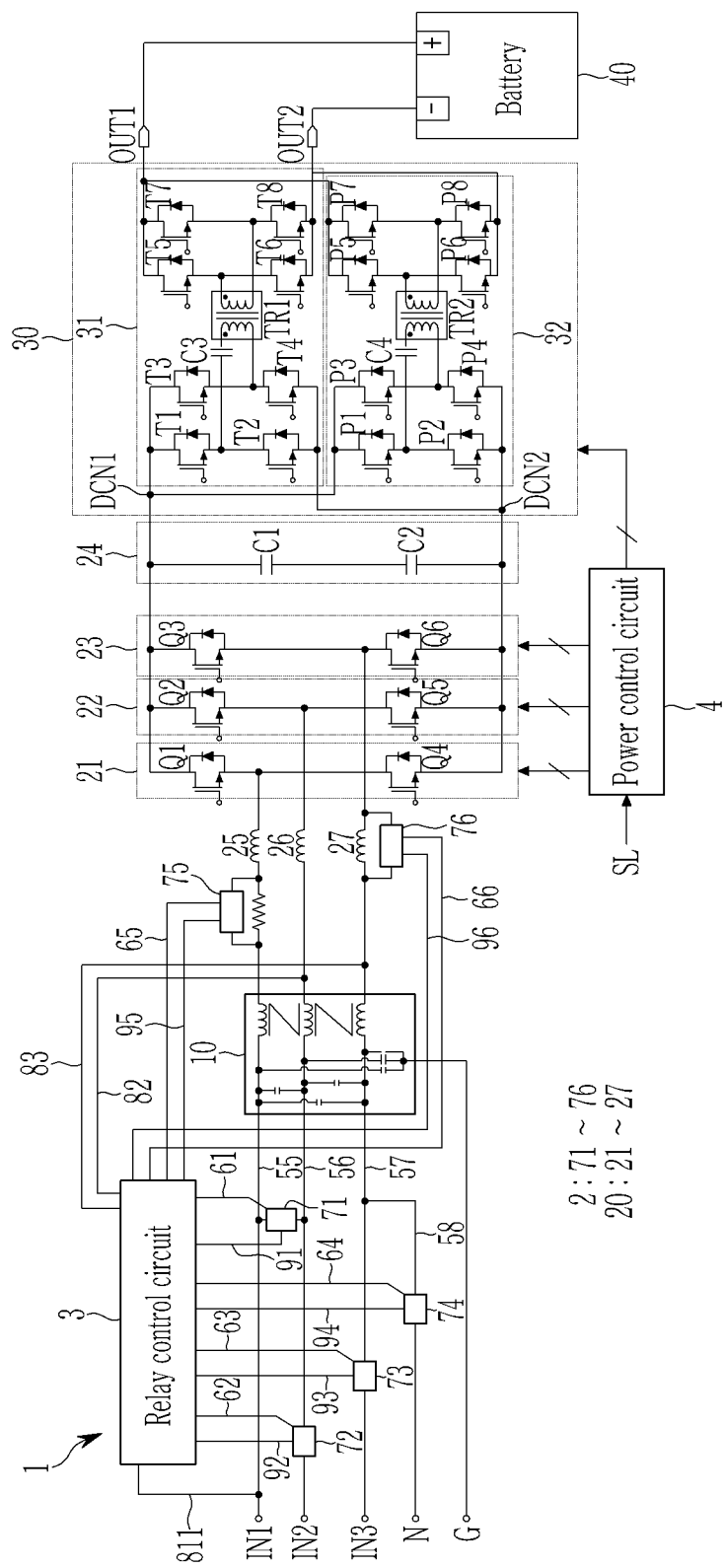
FIG. 1 illustrates a charging device according to an embodiment.

The following elements may be considered in connection with the drawings to describe illustrative embodiments.
1: charging device
2: relay network
3: relay control circuit
10: AC input filter
20: PFC circuit
30: power converting circuit

DETAILED DESCRIPTION OF ILLUSTRATIVE EMBODIMENTS

Embodiments of the present disclosure relate to an electromagnetic interference (EMI) filter that reduces conducted EMI noise emitted from an electronic device. More particularly, an EMI filter structure for removing additional noise generated when a relay switch and an active element are included in a filter circuit is proposed.

A charging device according to an embodiment may be connected between a power system and a battery to charge the battery with power supplied from the power system or to charge a load connected to the power system with power supplied from the battery.

Hereinafter, embodiments disclosed in the present specification will be described in detail with reference to the accompanying drawings, and in the present specification, the same or similar constituent elements will be denoted by the same or similar reference numerals, and a redundant description thereof will be omitted. The terms "module" and/or "unit, portion, or part" representing constituent elements used in the following description are used only in order to make understanding of the specification easier, and thus, these terms do not have meanings or roles that distinguish them from each other by themselves. In addition, in describing embodiments of the present specification, when it is determined that a detailed description of the well-known art associated with the present invention may obscure the gist of the present invention, it will be omitted. Further, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or it may be connected or coupled to the other constituent element with a further constituent element intervening therebetween. In contrast, it should be understood that, when it is described that an element is "directly coupled" or "directly connected" to another element, no element is present between the element and the other element.

In the present description, it should be understood that the term "include", "comprise", "have", or "configure" indicates that a feature, a number, a step, an operation, a constituent element, a part, or a combination thereof described in the specification is present, but it does not exclude a possibility of presence or addition of one or more other features, numbers, steps, operations, constituent elements, parts, or combinations, in advance.

FIG. 1 illustrates a charging device according to an embodiment.

In FIG. 1, an AC commercial power source connected to a power system is illustrated as a Y connection, but the commercial power source may be represented as a Δ connection. Hereinafter, it is obvious that the Δ connection may be applied instead of the Y connection in other drawings.

A charging device 1 includes a relay network 2, a relay control circuit 3, a power control circuit 4, an AC input filter 10, a PFC circuit 20, and a power converting circuit 30. The charging device 1 may convert the AC commercial power source to generate charging power for charging a battery 40. For example, a positive terminal (+) of the battery 40 may be connected to an output terminal OUT1, and a negative terminal (−) of the battery 40 may be connected to an output terminal OUT2.

The AC input filter 10 is an electromagnetic interference (EMI) filter for a plurality of power lines 55 to 57 connected between a plurality of input terminals IN1 to IN3 and the PFC circuit 20, and may eliminate noise that may be generated during an operation of the charging device 1. The power line 55 may be connected between the input terminal IN1 and the PFC circuit 20, the power line 56 may be connected between the input terminal IN2 and the PFC circuit 20, and the power line 57 may be connected between the input terminal IN3 and the PFC circuit 20. In FIG. 1, the AC input filter 10 is implemented as a one-stage structure including three capacitors connected between a plurality of power lines 55 to 57 and the ground (G), three capacitors connected between two of the plurality of power lines 55 to 57, and a choke circuit. As a noise level increases, the number of stages of the AC input filter 10 may increase.

The relay network 2 may control turning on or off of a plurality of relays 71 to 76 according to the phase of the power system connected to the input terminals IN1 to IN3 to control a connection relationship between the PFC circuit 20 and the power system. For example, when the charging device 1 converts power supplied from the power system to charge the battery, the relay network 2 may control the on/off of the plurality of relays 71 to 76 according to the phase of the AC commercial power source connected to the input terminals IN1 to IN3 to control the connection relationship between the PFC circuit 20 and the AC commercial power source.

The relay network 2 includes the plurality of relays 71 to 76, and the relay control circuit 3 may be connected to the plurality of input terminals IN1 to IN3 connected to the AC commercial power source to sense the phase of the AC commercial power source and to control the plurality of relays 71 to 76 according to the sensed phase. The relay control circuit 3 may generate a plurality of relay control signals RS1 to RS6 for controlling the on/off of the plurality of relays 71 to 76 according to the sensed phase to supply them to the plurality of relays 71 to 76. The plurality of relays 71 to 76 are turned on (closed) or turned off (opened) according to the plurality of relay control signals RS1 to RS6.

For example, when the AC commercial power source is a three-phase power source, the relay control circuit 3 may generate relay control signals RS2 and RS3 for turning on a plurality of relays 72 and 73 and relay control signals RS1, RS4, and RS6 for turning off a plurality of relays 71, 74, and 76 to supply them to the plurality of relays 71 to 76. In this case, the relay control circuit 3 may generate the phase sensing signal SL indicating the three-phase together to transmit it to the power control circuit 4.

In addition, when the AC commercial power source is a single-phase power source, the relay control circuit 3 may generate relay control signals RS1, RS4, and RS6 for turning on a plurality of relays 71, 74, and 76 and relay control signals RS2 and RS3 for turning off a plurality of relays 72 and 73 to supply them to the plurality of relays 71 to 76. In this case, the relay control circuit 3 may generate a phase sensing signal SL indicating the single-phase together to transmit it to the power control circuit 4.

The relay control circuit 3 may generate a relay control signal RS5 that turns on the relay 75 at a time point when a predetermined period elapses from a time point when a charging operation starts, regardless of the single-phase or three-phase, and may supply it to the relay 75.

One end of the relay 71 is connected to one end of an inductor 25 and the input terminal IN1, and the other end of the relay 71 is connected between the input terminal IN2 and one end of an inductor 26. The relay 72 is connected to the input terminal IN2 and one end of the inductor 26, the relay 73 is connected to the input terminal IN3 and one end of an inductor 27, and the relay 74 is connected between the neutral point (N) and one end of the inductor 27. The relay 75 is connected between the input terminal IN1 and one end of the inductor 25, and the relay 76 is connected in parallel to the inductor 27. The plurality of relays 71 to 76 may be implemented as electronic relays or mechanical relays.

Figure 2:
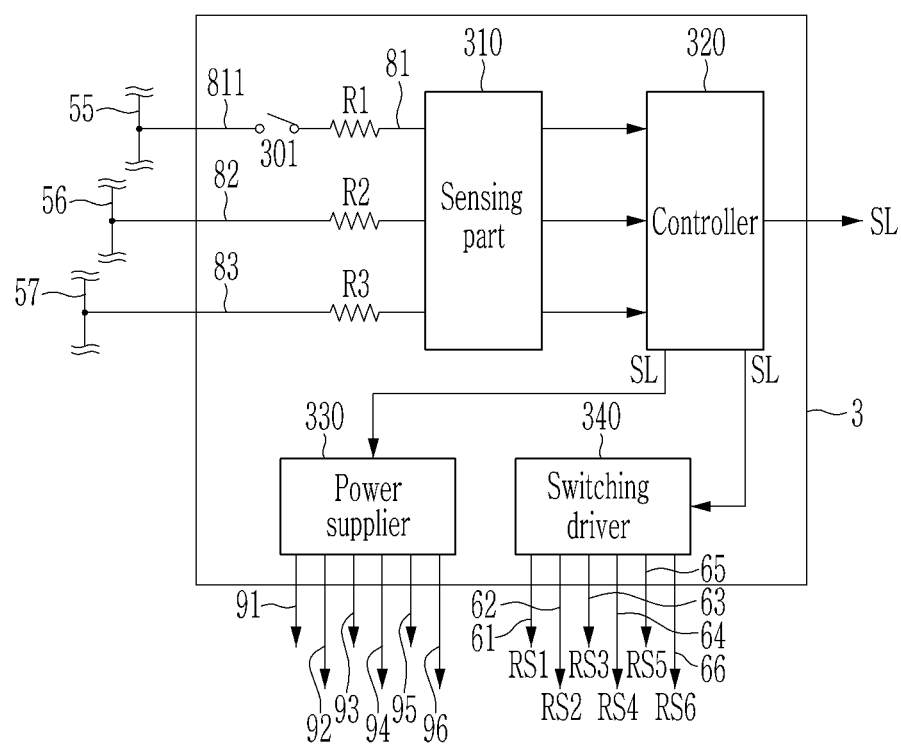
FIG. 2 schematically illustrates a relay control circuit according to an embodiment.

FIG. 2 schematically illustrates a relay control circuit according to an embodiment.

Figure 3:
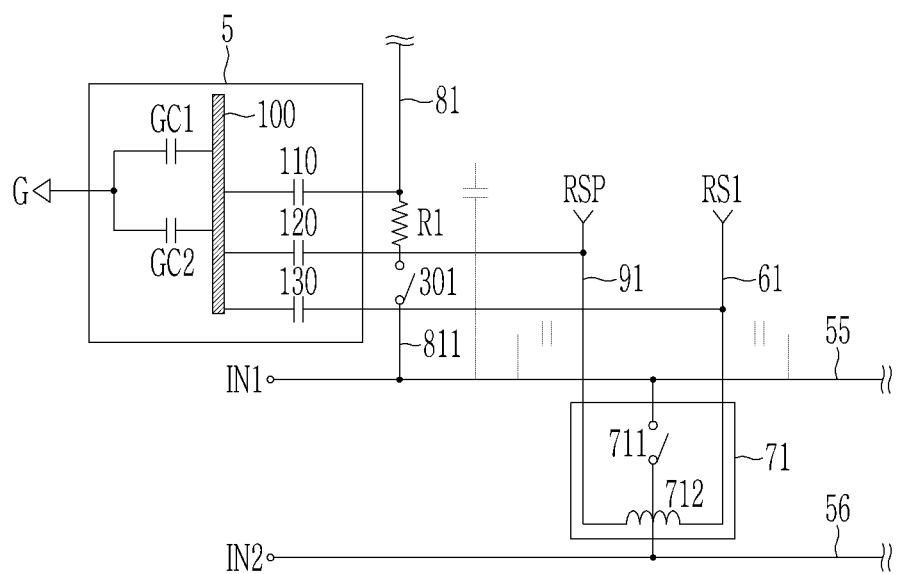
FIG. 3 partially illustrates a relay and a relay filter circuit according to an embodiment.

FIG. 3 partially illustrates a relay and a relay filter circuit according to an embodiment.

In FIG. 1, a relay filter circuit according to the embodiment is not shown. This is so as to not obscure the understanding of embodiments of the invention as FIG. 1 is shown in a complicated manner.

As shown in FIG. 2, the relay control circuit 3 includes a sensing part 310, a controller 320, a power supplier 330, and a switching driver 340.

The sensing part 310 is connected to three power lines 55 to 57 through lines 81 to 83 and line 811, a switch 301, and resistors R1 to R3, and may sense a voltage of each of the input terminals IN1 to IN3, and may generate three signals (hereinafter, sensing signals) indicating three voltages sensed at the input terminals IN1 to IN3 to transmit them to the controller 320. Lines 82 and 83 may be connected to power lines 56 and 57 between the filter 10 and the inductors 26 and 27.

The controller 320 may receive three sensing signals from the sensing part 310, and determine a phase of a system connected to the three input terminals IN1 to IN3. For example, the controller 320 may determine that the AC commercial power source is a three-phase power source when a voltage of a predetermined reference value or more is sensed at each of all power lines 55 to 57, and it may determine that the AC commercial power source is a single-phase power source when a voltage of a predetermined reference value or more is sensed only at the power line 55. The controller 320 generates a phase sensing signal SL indicating the phase of the AC commercial power source to transmit it to the switching driver 340 and the power supplier 330.

The power supplier 330 may supply a power voltage for controlling the switching operation of the plurality of relays 71 to 76 according to the phase sensing signal SL to the plurality of relays 71 to 76, and the switching driver 340 generates the relay signals RS1-RS6 for controlling the switching operation of the plurality of relays 71 to 76 according to the phase sensing signal SL to supply them to the plurality of relays 71 to 76. The power supplier 330 is connected to a plurality of lines 91 to 96, and the switching driver 340 is connected to a plurality of lines 61 to 66.

When the AC commercial power source is a three-phase power source, the power supplier 330 may supply a power voltage for turning on the plurality of relays 72 and 73 to the lines 92 and 93, and the switching driver 340 may supply the relay control signals RS2 and RS3 for turning on the plurality of relays 72 and 73 to the lines 62 and 63. The power supplier 330 may supply a power voltage for turning off the plurality of relays 71, 74, and 76 to the lines 91, 94, and 96, and the switching driver 340 may generate the relay control signals RS1, RS4, and RS6 for turning off the plurality of relays 71, 74, and 76 to supply them to the plurality of lines 61, 64, and 66.

When the AC commercial power source is a single-phase power source, the power supplier 330 may supply a power voltage for turning on the plurality of relays 71, 74, and 76 to the lines 91, 94, and 96, and the switching driver 340 may supply the relay control signals RS1, RS4, and RS6 for turning on the plurality of relays 71, 74, and 76 to the lines 61, 64, and 66. The power supplier 330 may supply a power voltage for turning off the plurality of relays 72 and 73 to the lines 92 and 93, and the switching driver 340 may generate the relay control signals RS2 and RS3 for turning off the plurality of relays 72 and 73 to supply them to the plurality of lines 62 and 63.

A difference between the power voltage level that turns on the relay and the relay control signal level may be larger than a difference between the power voltage level that turns off the relay and the relay control signal level.

In order for the sensing part 310 to sense the voltage of the input terminals IN1 to IN3, the lines 81, 82, and 83 connected to the power lines 55 to 57 are low voltage lines and may be sources of low voltage noise. In addition, the lines 91 to 96 connected between the power supplier 330 and the plurality of relays 71 to 76 and the lines 61 to 66 connected between the switching driver 340 and the plurality of relays 71 to 76 are also low voltage lines and may be sources of low voltage noise. Since parasitic capacitance is generated between the low voltage lines and the power lines 55 to 57, low voltage noise generated in the low voltage lines may be coupled to the plurality of power lines 55 to 57. For ease of understanding, the parasitic capacitance between the power line and the low voltage line is shown as a dotted line in FIG. 3.

As shown in FIG. 3, the relay 71 includes an inductor 712 and a switch 711. One end of the inductor 712 may be connected to the line 91, the other end of the inductor 712 may be connected to the line 61, and ends of the switch 711 may be connected between the power line 55 and the power line 56. When the power voltage and the relay control signal RS1 that turn on the relay 71 are supplied to the inductor 712 so that a current flows, the switch 711 is closed. Conversely, when the power voltage and the relay control signal RS1 that turn off the relay 71 are supplied to the inductor 712, no current may flow in the inductor 712, and the switch 711 may be opened. The structure of the relay 71 shown in FIG. 3 is an example for explanation, and various types of relays may be applied to embodiments.

As shown in FIG. 3, the relay filter circuit 5 includes a ground plane 100, capacitors GC1 and GC2 between the ground plane 100 and a chassis (not shown), and a plurality of capacitors. The relay filter circuit 5 prevents low voltage noise from being emitted to the input terminals IN1 to IN3 without passing through the AC input filter 10 due to parasitic capacitance.

The ground plane 100 may be made of a planar metal. The shape of the ground plane 100 is not limited, and may be any surface having a predetermined area necessary to prevent low voltage noise. In order to minimize inductance of a pattern, the ground plane 100 may be designed so that a thickness thereof is not thin and a length thereof is not long.

The chassis means an external housing on which the charging device 1 is mounted, and the capacitors GC1 and GC2 are formed between the ground plane 100 and the chassis. In FIG. 3, the capacitors GC1 and GC2 are illustrated as being connected in parallel between the ground plane 100 and the chassis, but it is only a schematic illustration of the capacitance between the ground plane 100 and the chassis, and the capacitance between the ground plane 100 and the chassis may be shown as one capacitor or three or more capacitors connected in parallel. Capacitor 110 is connected between the line 81 and the ground plane 100, capacitor 120 is connected between the line 91 and the ground plane 100, and capacitor 130 is connected between the line 61 and the ground plane 100. Each of the capacitors 110 to 130 is a decoupling capacitor that removes noise generated in a connected line by the ground plane 100. That is, the noise from the lines 81, 91, and 61 flows to the chassis through the ground plane 100.

In FIG. 3, only components for filtering the noise generated in the lines 81, 91, and 61 connected to the relay 71 are shown, but filtering components may be applied to other relays 72 to 76 in the same manner. Accordingly, the relay filter circuit 5 may include a plurality of capacitors connected between the lines 81 to 83, the lines 91 to 96 and 61 to 66 for driving the plurality of relays 71 to 76, and the ground plane 100.

Figure 4:
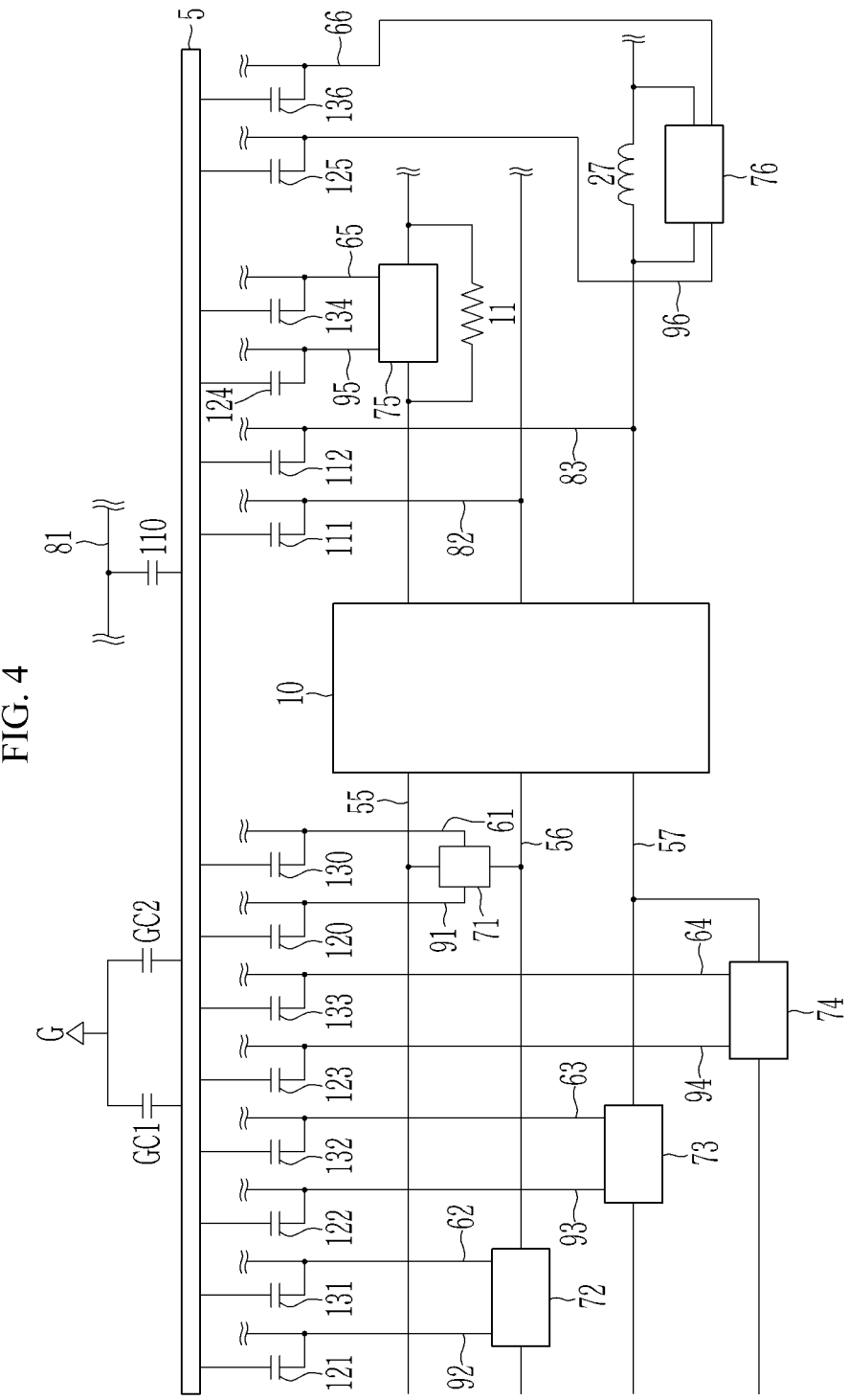
FIG. 4 illustrates a relay filter circuit according to an embodiment.

FIG. 4 illustrates a relay filter circuit according to an embodiment.

In FIG. 4, only components for explaining the relay filter circuit 5 are shown.

A plurality of capacitors 110, 111, and 112 are connected between the lines 81, 82, and 83 connected to the power lines 55 to 57 and the ground plane 100 to sense the voltage of the input terminals IN1 to IN3. A plurality of capacitors 120 to 125 are connected between the plurality of lines 91-96 and the ground plane 100 that transmit a power voltage for driving a relay. A plurality of capacitors 130 to 135 are connected between the plurality of lines 61 to 66 and the ground plane 100 that transmit the relay control signals RS1 to RS6 to control turning on or off of a relay. Through the embodiment, the noise generated in the low voltage lines 81 to 83, 91 to 96, and 61 to 66 flows to the chassis through the ground plane 100, so that the noise is not emitted to the AC commercial power source through the input terminals IN1 to IN3. The plurality of capacitors 110 to 112, 120 to 125, and 130 to 135 and the capacitors GC1 and GC2 may be designed to have an optimal capacitance according to the input impedance of the charging device 1. The ground plane 100 may be configured in a planar shape to minimize high-frequency band impedance.

The PFC circuit 20 includes three switch legs 21 to 23, three inductors 25 to 27, and a PFC link capacitor 24. The PFC circuit 20 may operate according to a switch control signal supplied from the power control circuit 4. The power control circuit 4 may control a switching operation of the PFC circuit 20 according to the case in which the AC commercial power source is a single-phase power source or a three-phase power source according to the phase sensing signal SL.

When the AC commercial power source is the three-phase power source, the PFC circuit 20 receives a three-phase line-to-line voltage to operate as a 3-leg boost PFC. When the AC commercial power source is a single-phase input, the PFC circuit 20 receives a voltage between the input terminal IN1 and the neutral point (N) to operate as a PFC of a single inductor type of interleaved single-phase full-bridge structure. That is, the PFC circuit 20 uses three input terminals IN1, IN2, and IN3 as a power source in a case of a three-phase, and uses a voltage between the input terminal IN1 and the neutral point (N) as a power source in a case of a single-phase. In a case of a single phase, the relay 71 is turned on and all of the first to third switch legs 21 to 23 are used for power transmission, the switch leg 23 is connected to the neutral point (N), and the inductor 27 is deactivated by turn-on of the relay 76. Then, it is converted into a single inductor structure between the input terminal IN1 and the neutral point (N), and the PFC circuit 20 is an interleaved single-phase full-bridge structure. In this case, the PFC circuit 20 may operate as a unipolar totem pole control.

The PFC link capacitor 24 includes two capacitors C1 and C2, and generates a DC voltage by being charged with a current transmitted according to an operation of each of the three switch legs 21 to 23.

The power converting circuit 30 converts the voltage charged in the PFC link capacitor 24 to generate and supply a DC voltage suitable for a load. Two input terminals DCN1 and DCN2 of the power converting circuit 30 are connected to both ends of the PFC link capacitor 24. Although no load is shown in FIG. 1, an example of the load may include a battery, and the battery may be connected between two output terminals OUT1 and OUT2 to be charged.

The power converting circuit 30 includes two DC-DC converters connected in parallel between the two input terminals DCN1 and DCN2 and the two output terminals OUT1 and OUT2. The structure in which the two DC-DC converters are connected in parallel is an example according to the embodiment, but the present invention is not limited thereto, and the power converting circuit 30 may be implemented with an appropriate number of DC-DC converters according to a size of the load.

A DC-DC converter 31 includes four switching elements T1 to T4 connected as a full-bridge to one side thereof, four switching elements T5 to T8 connected as a full-bridge to the other side thereof, an insulating transformer TR1 between the one side and the other side, and a capacitor C3.

A DC-DC converter 32 includes four switching elements P1 to P4 connected as a full-bridge to one side thereof, four switching elements P5 to P8 connected as a full-bridge to the other side thereof, an insulating transformer TR2 between the one side and the other side, and a capacitor C4.

The power control circuit 4 may control power converting operations of the DC-DC converter 31 and the DC-DC converter 32. For example, the power control circuit 4 may receive an output voltage supplied to the battery 40 as feedback to generate a control signal for controlling a switching frequency or duty ratio of the DC-DC converter 31 and the DC-DC converter 32 to supply it to the DC-DC converter 31 and the DC-DC converter 32. Since a detailed control method thereof is the same as the control method of the converter of the LLC resonant full-bridge structure, a detailed description thereof is omitted.

In FIG. 1, the DC-DC converters 31 and 32 are implemented as the LLC resonant full-bridge, but the present invention is not limited thereto, and they may be implemented as other types. The operation of the DC-DC converter is apparent to a person of ordinary skill in the art to which the present invention pertains, and thus a detailed description thereof is omitted.

Figure 5:
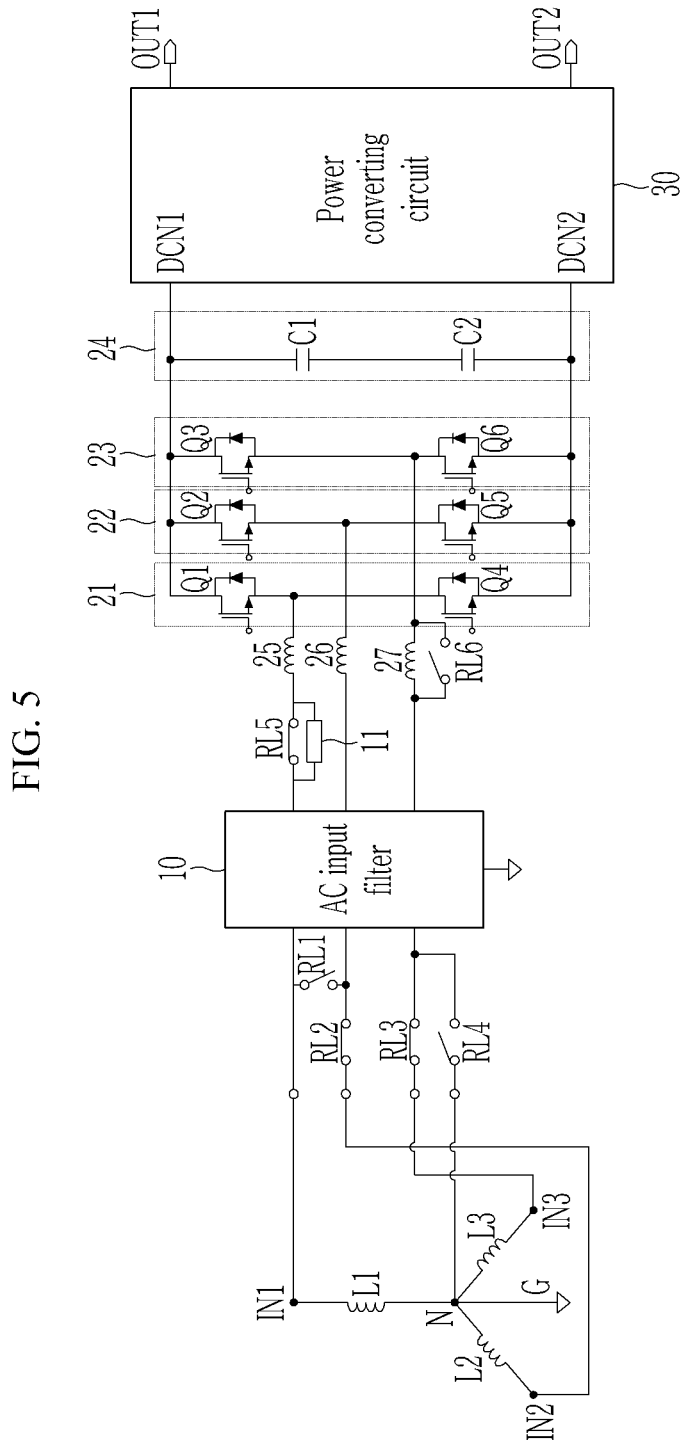
FIG. 5 illustrates, when an AC commercial power source is a three-phase power source, a circuit diagram for explaining an operation thereof.

FIG. 5 illustrates, when an AC commercial power source is a three-phase power source, a circuit diagram for explaining an operation thereof.

As shown in FIG. 5, a 3-phase power source is transmitted to each of the three input terminals IN1, IN2, and IN3 through three inductors L1, L2, and L3.

The relay control circuit 3 senses that the AC commercial power source is a 3-phase power source, turns on the relays 72 and 73, turns off the relays 71, 74, and 76, and turns on the relay 75 after a voltage inputted to the PFC circuit 20 has peaked. The relay 75 is a relay for protecting elements such as the PFC link capacitor 24 when an inrush current flows by the high voltage of the input terminal. Until the voltage input of the PFC circuit 20 reaches the peak, the relay 75 is turned off, and an input from the input terminal IN1 is supplied to the PFC circuit 20 through a resistor 11. After reaching the peak, the relay 75 is turned on, and the input from the input terminal IN1 is supplied to the PFC circuit 20 through the relay 75, not through the resistor 11. The relay 75 is turned off until the voltage input of the PFC circuit 20 reaches the peak regardless of a single-phase or three-phase, and is turned on after the peak.

When the AC commercial power source is a 3-phase power source, the input terminals IN1, IN2, and IN3 are respectively connected to the inductors 25, 26, and 27, and the PFC circuit 20 operates as a 3-leg boost PFC. The current flowing through each inductor 25, 26, and 27 is transmitted to the PFC link capacitor 24 according to a switching operation of each of the first to third switch legs 21, 22, and 23. For example, the input terminal IN1 is connected to the inductor 25, and the inductor 25 and the first switch leg 21 operate as a boost PFC. A current flows in the inductor 25 by the voltage of the input terminal IN1, the current flowing in the inductor 25 during an ON period of a switch Q1 charges the PFC link capacitor 24, and a current flows through the inductor L1 and a switch Q2 during an OFF period of the switch Q1 and an ON period of the switch Q2.

Figure 6:
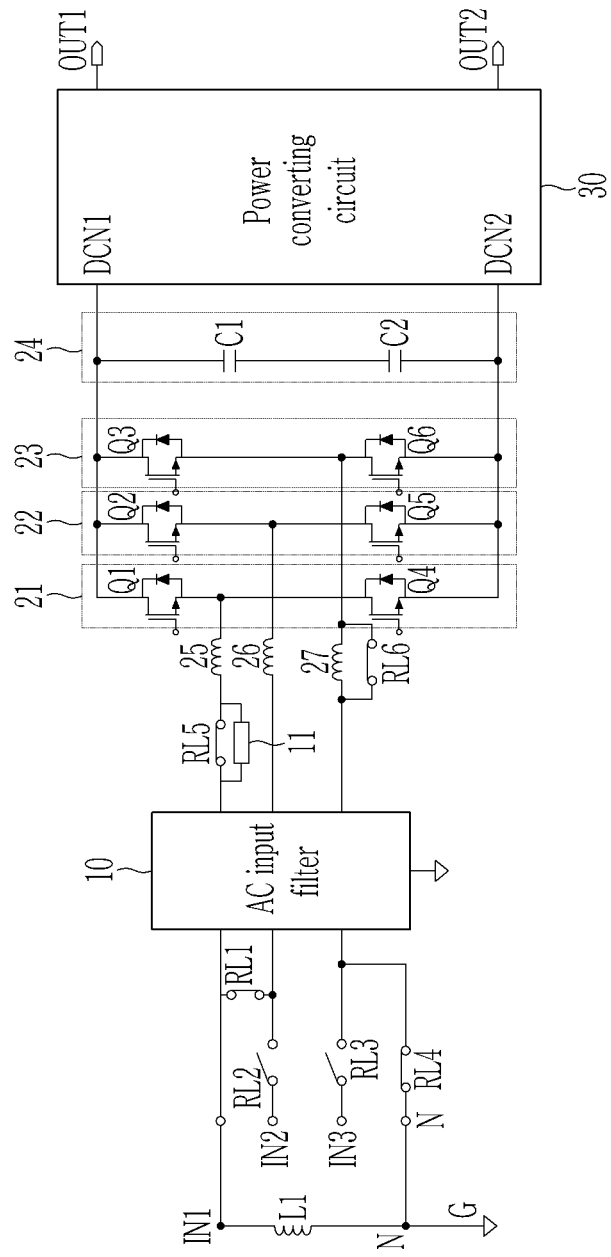
FIG. 6 illustrates, when an AC commercial power source is a single-phase power source, a circuit diagram for explaining an operation thereof.

FIG. 6 illustrates, when an AC commercial power source is a single-phase power source, a circuit diagram for explaining an operation thereof.

As shown in FIG. 6, a single-phase power source is transmitted to the input terminal IN1 through the inductor L1.

The relay control circuit 3 senses that the AC commercial power source is a single-phase power source, turns on the relays 71, 74, and 76, turns off the relays 72 and 73, and turns on the relay 75 after a voltage inputted to the PFC circuit 20 has peaked.

The relay 71 is turned on, so that the input terminal IN1 is connected to the first switch leg 21 and the second switch leg 22, a current flowing through the inductor L1 branches to the first and second switch legs 21 and 22, and the first and second switch legs 21 and 22 operate in an interleaved manner.

The relay 74 is turned on, so that the neutral point (N) and the third switch leg 23 are connected, and the relay 76 is turned on, so that the PFC circuit 20 performs an interleaved full-bridge PFC operation with a single-phase single inductor structure. That is, the relay 71 is turned on, so that the first to third switch legs 21 to 23 perform power transmission. The third switch leg 23 is connected to the neutral point (N), and the inductor 27 is deactivated when the relay 76 is turned on.

FIG. 7A to FIG. 7D illustrate, when an input power source is a single-phase power source according to an embodiment, circuit diagrams for explaining an operation of a PFC circuit.

Figure 7A:
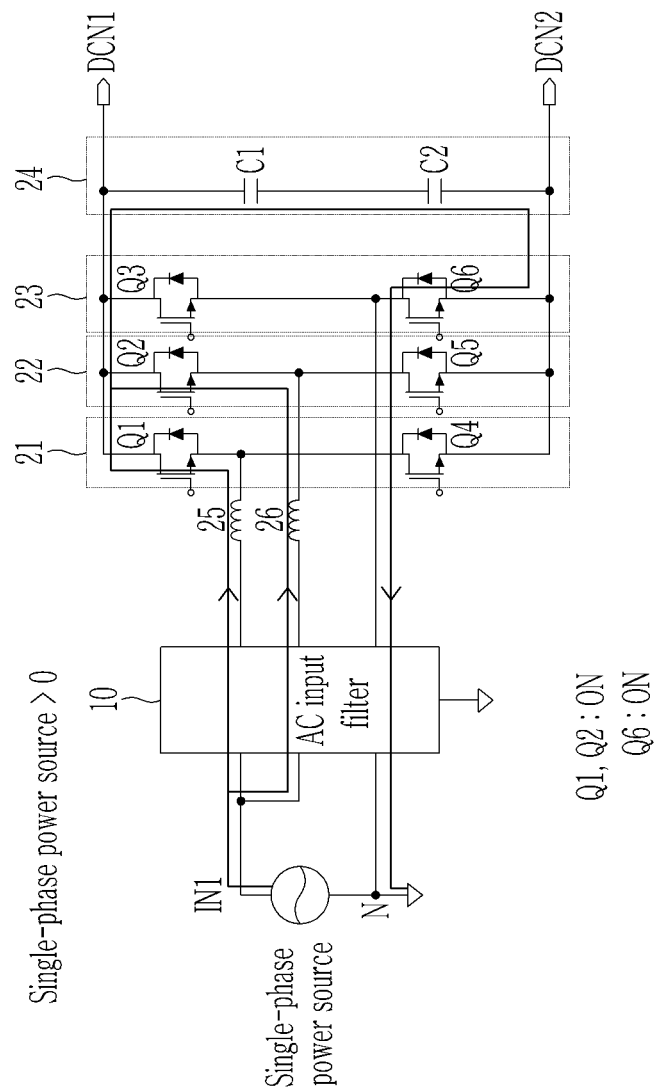
FIG. 7A to FIG. 7D illustrate, when an input power source is a single-phase power source according to an embodiment, circuit diagrams for explaining an operation of a PFC circuit.
Figure 7B:
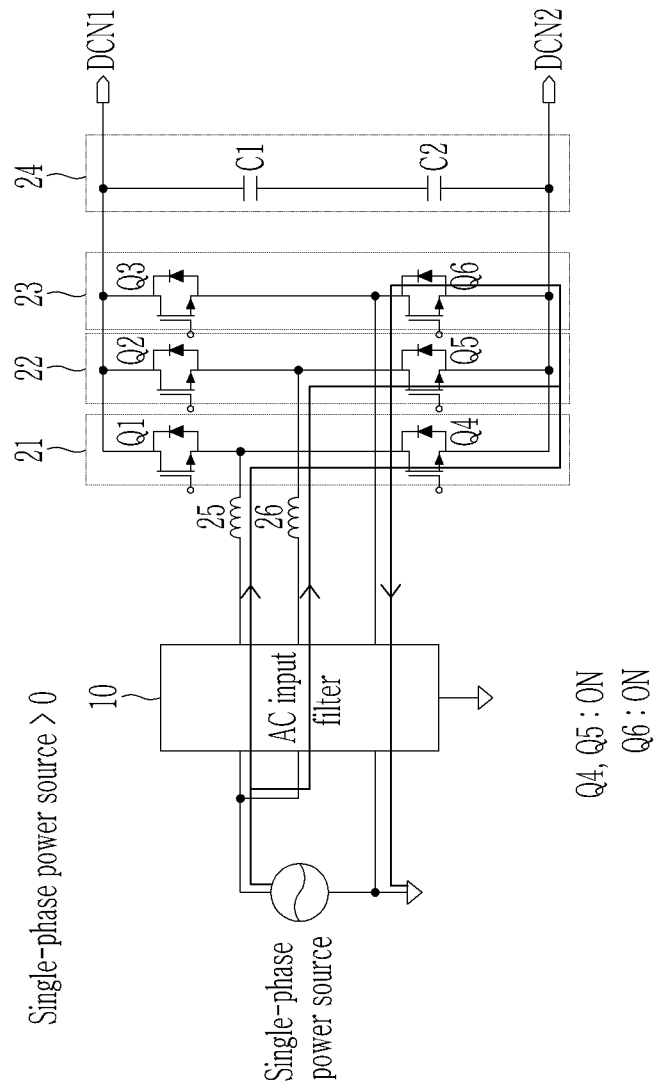
Figure 7C:
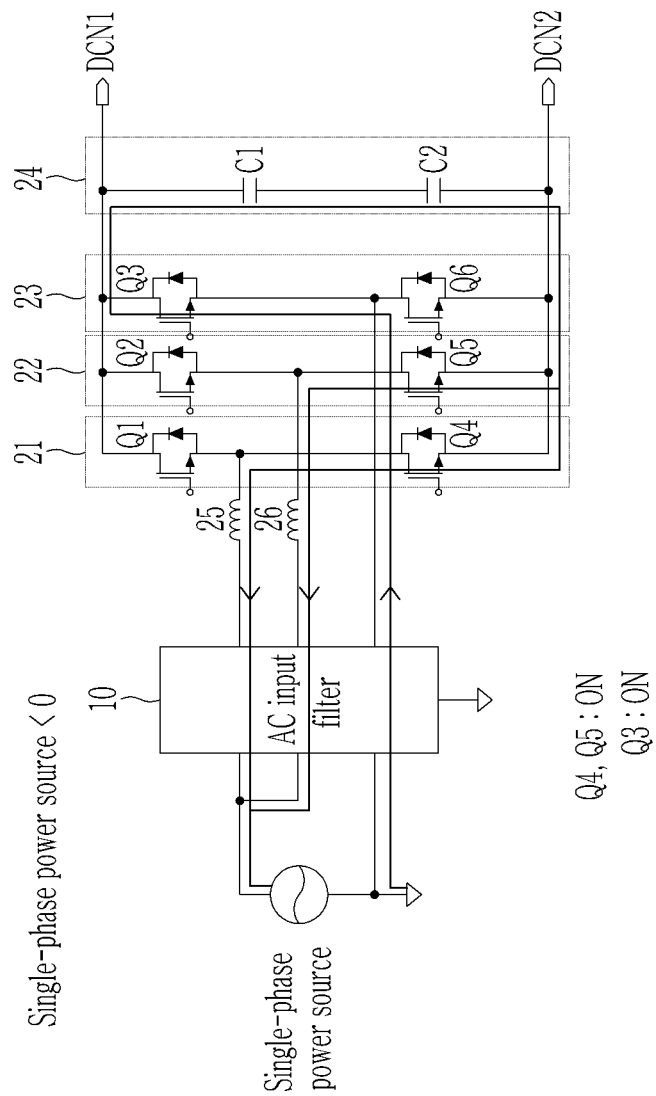
Figure 7D:
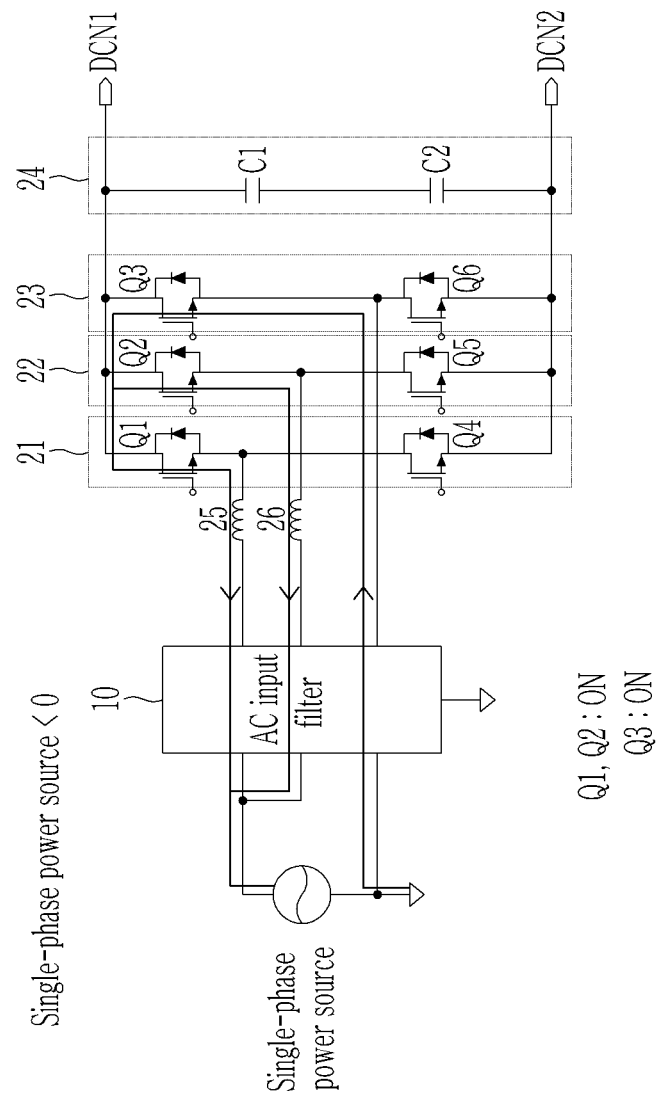

FIG. 7A and FIG. 7B illustrate current paths according to the operation of the first to third switch legs 21 to 23 when the single-phase power source, which is a sinusoidal wave, has a positive voltage. FIG. 7C and FIG. 7D illustrate current paths according to the operation of the first to third switch legs 21 to 23 when the single-phase power source, which is a sinusoidal wave, has a negative voltage. FIG. 7A and FIG. 7C illustrate power supplying operations of the PFC circuit 20, and FIG. 7B and FIG. 7D illustrate power recovering operations of the PFC circuit 20. As shown in FIG. 7A, during a period when switches Q1, Q2, and Q6 are turned on, a current flows through the inductors 25 and 26, the switches Q1 and Q2, the capacitors C1 and C2, and the switch Q6 by a voltage of the single-phase power source. During this period, power is supplied to the capacitors C1 and C2.

Then, as shown in FIG. 7B, during a period when switches Q4, Q5, and Q6 are turned on, a current flows through the inductors 25 and 26 and the switches Q4, Q5, and Q6 by a voltage of the single-phase power source. During this period, a power recovering operation in which energy is stored in the inductors 25 and 26 is performed.

As shown in FIG. 7C, during a period when the switches Q3, Q4, and Q5 are turned on, a current flows through the switch Q3, the capacitors C1 and C2, the switches Q4 and Q5, and the inductors 25 and 26 by the voltage of the single-phase power source. During this period, power is supplied to the capacitors C1 and C2.

Then, as shown in FIG. 7D, during a period when the switches Q1, Q2, and Q3 are turned on, a current flows through the inductors 25 and 26 and the switches Q1, Q2, and Q3 by the voltage of the single-phase power source. During this period, a power recovering operation in which energy is stored in the inductors 25 and 26 is performed.

As a driving distance on a single charge of an electric vehicle is increasing, an increase in battery capacity is required. Accordingly, large-capacity charging is required for an on board charger (OBC), thus an increase in charging power is required.

A conventional charger has a two-stage structure of a PFC circuit and a DC/DC converter, and may be operated only under a single-phase input power condition. In order to implement charging in a three-phase power input condition, the chargers connected to each phase of the three-phase power source should be connected in three-parallel. Then, the circuit complexity thereof increases, resulting in an increase in material cost and volume/weight. A charger including only a PFC circuit implemented with a boost converter has a simple circuit structure, but normal charging is impossible when a battery required voltage thereof is lower than an input voltage thereof. A buck-boost type of charger may perform a charging operation in an entire period of an output voltage required by a battery, but its control is complicated and there is a section where an AC input voltage is low compared to the output voltage, so a power factor (PF) characteristic is disadvantageous, and since the boost converter is directly connected to the battery, a high output current ripple is applied to the battery, which adversely affects battery life and heat generation.

Embodiments of the present invention relate to a charging device including a relay network for converting a PFC circuit into a charging system optimized according to various AC power conditions, that is, various power conditions for each country. Embodiments of the present invention may provide a charging device that may perform a charging operation with high charging efficiency according to a wide range of input power sources and a wide range of battery charging voltages and may have a simpler circuit structure than that in the prior art.

In the case of the prior art in which the OBC is designed for the three-phase input, it is difficult to generate and supply sufficient charging power for the single-phase input. For example, for the single-phase input, the conventional OBC could supply only 3.6 kW of charging power. However, the charging device 1 according to an embodiment may adjust the link voltage supplied to the power converting circuit 30 by using the PFC circuit 20 of the 3-phase 3-leg inverter type. Accordingly, the charging device 1 may supply sufficient charging power (for example, 7.2 kW) to the battery 40 even for the single-phase input.

In addition, since the charging device 1 according to an embodiment may adjust the link voltage, the ratio of the number of turns, which is a ratio between the number of turns on one side and the number of turns on the other side of transformers TR1 and TR2, may be designed close to 1:1. Through this, the charging device 1 may supply power to the power system connected through the input terminal of the charging device 1 from the battery 40 in a power supplying direction (hereinafter, forward direction) for charging the battery 40 and an opposite direction thereof (hereinafter, reverse direction). A load connected to the power system may be a three-phase load or a single-phase load.

Hereinafter, the operation in which the charging device 1 supplies power from the battery 40 to the load will be described with reference to FIG. 8 to FIG. 10.

Figure 8:
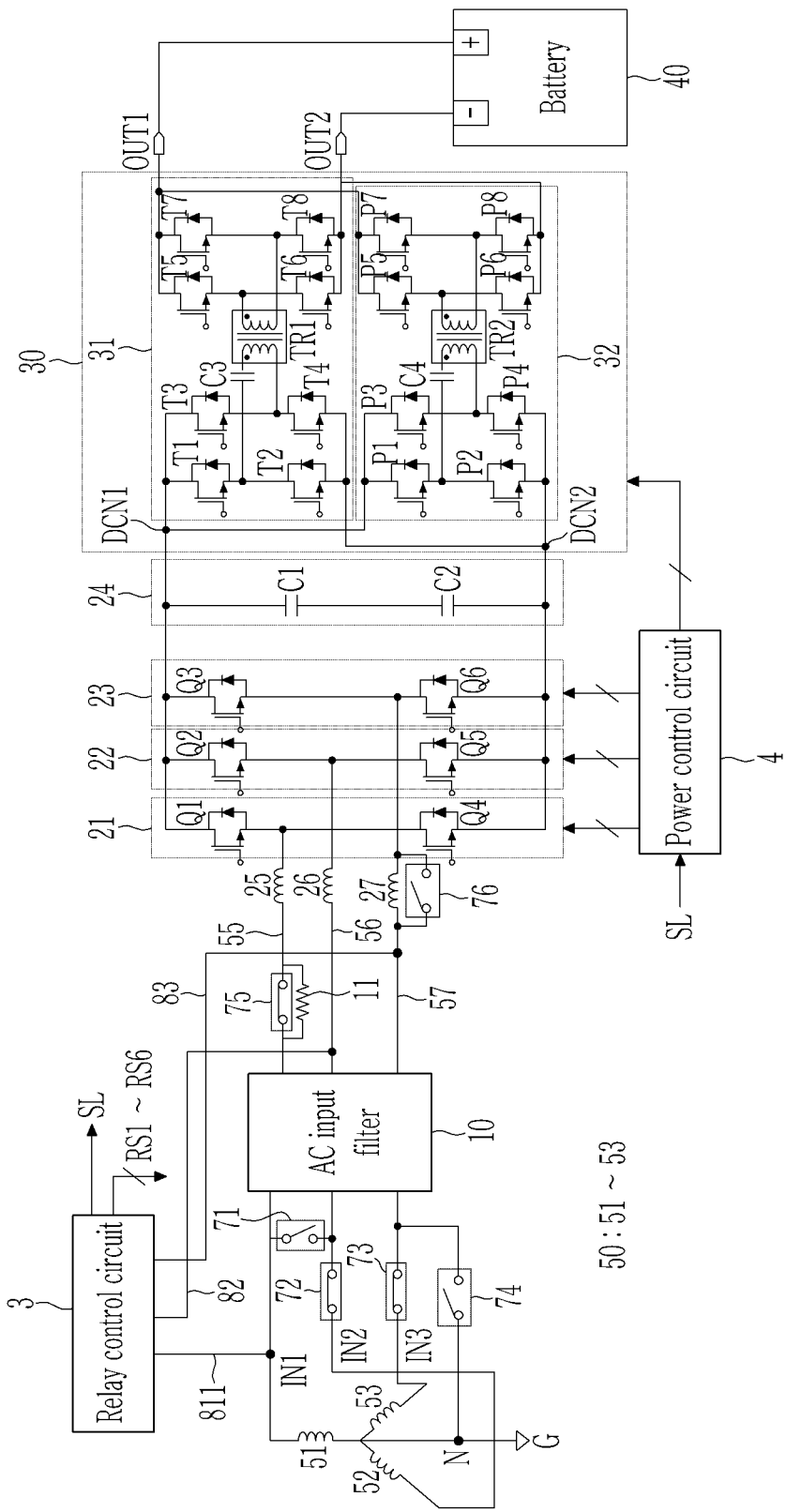
FIG. 8 illustrates a drawing for explaining an operation when a charging device according to an embodiment supplies power to a three-phase load in a reverse direction.

FIG. 8 illustrates a drawing for explaining an operation when a charging device according to an embodiment supplies power to a three-phase load in a reverse direction.

In FIG. 8, only components for explaining an operation of supplying power to a three-phase load in a reverse direction are shown. Only the connection state of each of the plurality of relays 71 to 76 is shown, and the plurality of lines 61 to 66 and 91 to 96 and the relay filter circuit are not shown. However, the relay filter circuit for filtering the noise generated in the plurality of lines 61 to 66, 91 to 96, 81, 82, and 83 may also be applied to the embodiment of FIG. 8.

Respective phases of a three-phase load 50 are shown in FIG. 8 as three inductors 51 to 53. The inductor 51 is connected between the input terminal IN1 and the neutral point (N), the inductor 52 is connected between the input terminal IN2 and the neutral point (N), and the inductor 53 is connected between the input terminal IN3 and the neutral point (N). In FIG. 8, the three-phase load 50 is shown as three inductors 51 to 53, but the present invention is not limited thereto. Each load of the three-phase load 50 may be implemented as one of a resistor, an inductor, and a capacitor, or a combination of at least two thereof.

Compared with FIG. 1, the same reference numerals are denoted for the same components, and duplicate descriptions will be omitted below.

The relay control circuit 3 may sense a load connected to the plurality of input terminals IN1 to IN3 to determine whether the load is a three-phase load or a single-phase load. When the load connected to the plurality of input terminals IN1 to IN3 is a 3-phase load, the relay control circuit 3 may generate the relay control signals RS2 and RS3 for turning on the plurality of relays 72 and 73, and the relay control signals RS1, RS4, and RS6 for turning off the plurality of relays 71, 74, and 76 to supply them to the plurality of relays 71, 74, and 76. In this case, the relay control circuit 3 may generate the phase sensing signal SL indicating the three-phase together to transmit it to the power control circuit 4. The relay control circuit 3 turns on the relay 75 at a time point when a predetermined period has elapsed from the start of the charging operation.

The positive terminal (+) and the negative terminal (−) of the battery 40 are connected to the two output terminals OUT1 and OUT2, and power is supplied from the battery 40 to the power converting circuit 30 through the two output terminals OUT1 and OUT2. First, an operation in which power is supplied from the battery 40 to the PFC circuit 20 through the power converting circuit 30 will be described. Only one of the DC-DC converter 31 and the DC-DC converter 32 may perform the power supplying operation. For example, an operation in which the DC-DC converter 31 supplies power from the battery 40 to the PFC circuit 20 will be described. In this case, the switches P5 to P8 of the DC-DC converter 32 may be replaced with diodes.

The voltage between the positive terminal (+) and the negative terminal (−) of the battery 40 is supplied as the input voltage of the DC-DC converter 31. When the DC-DC converter 31 converts the input voltage in the reverse direction and supplies it to the PFC circuit 20, all switches T1 to T4 positioned at one side are turned off. According to the switching operation of the switches T5 to T8 positioned at the other side, a current path is formed through body-diodes of the switches positioned at the one side.

For example, during the on period of the switches T5 and T8 and the off period of the switches T6 and T7, a resonant current flowing in the other side of the transformer TR1 flows through the switches T5 and T8, and power is transmitted to one side of the transformer TR1. In this case, the current flows through the body-diodes of the switches T1 and T4, so power is supplied to the PFC circuit 20. Then, there is a dead time in which all switches T5 to T8 are turned off. After the dead time, during the on period of the switches T6 and T7 and the off period of the switches T5 and T8, a resonant current flowing in the other side of the transformer TR1 flows through the switches T6 and T7, and power is transmitted to one side of the transformer TR1. In this case, the current flows through the body-diodes of the switches T2 and T3, so power is supplied to the PFC circuit 20. Then, there is a dead time in which all switches T5 to T8 are turned off. This operation is repeated, so that power is supplied from the battery 40 connected to the other side of the power converting circuit 30 to the PFC circuit 20 connected to the one side of the power converting circuit 30.

The PFC link capacitor 24 may be charged with the energy supplied from the DC-DC converter 31, and may smooth the voltage inputted to the PFC circuit 20. The PFC circuit 20 may supply AC power to the three-phase load 50 according to the switching operation of the first to third switch legs 21 to 23. For example, the power control circuit 4 controls the PFC circuit 20 to operate as a three-phase inverter according to the phase sensing signal SL. That is, the first to third switch legs 21 to 23 perform switching operations with a phase difference of 120 degrees, and the switching operations of the two switches (for example, Q1 and Q4) in each of the first to third switch legs 21 to 23 are complementary switching with a phase difference of 180 degrees. The operation of the three-phase inverter is a known technology, so a detailed description thereof is omitted.

Figure 9:
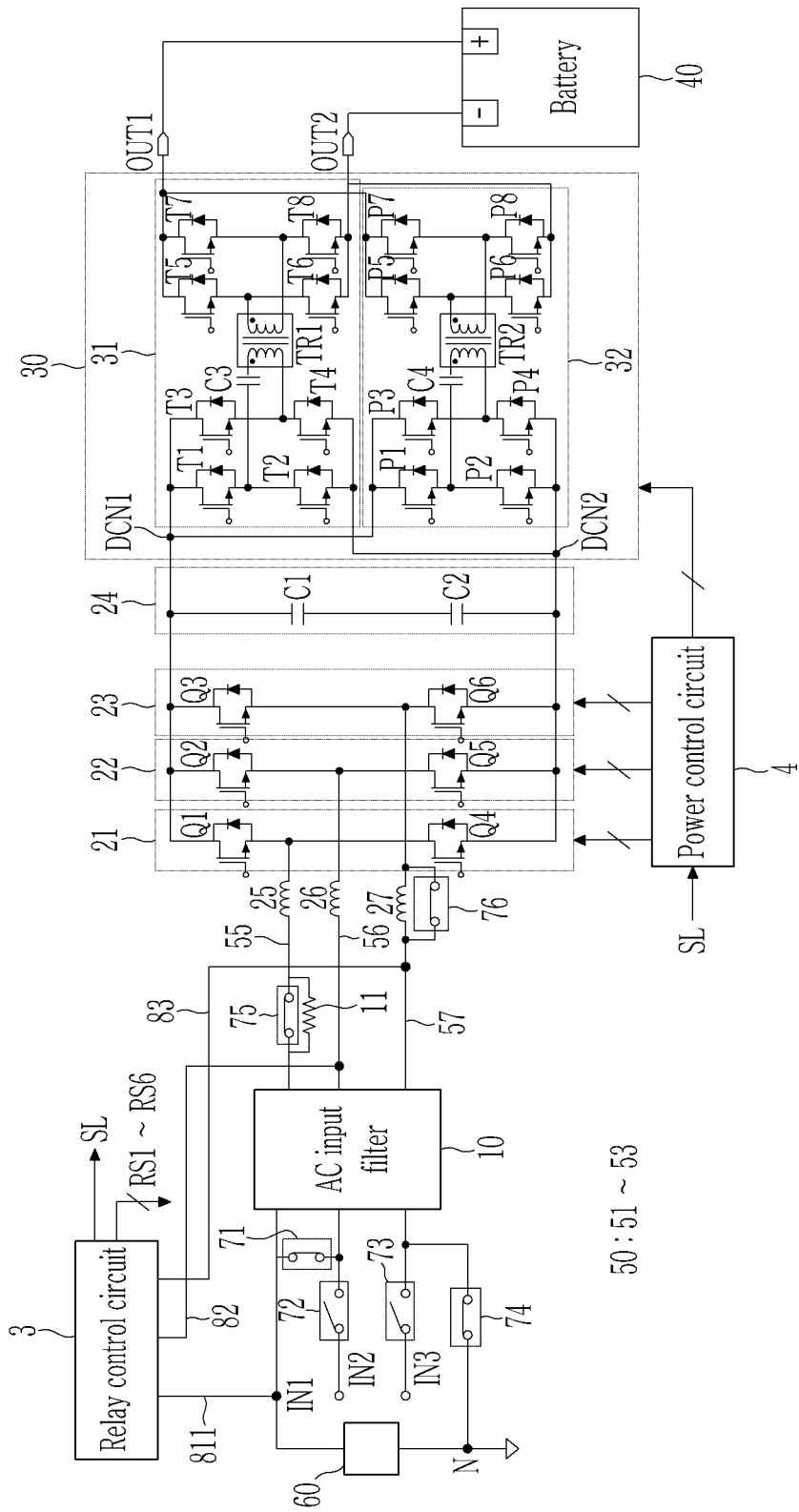
FIG. 9 illustrates a drawing for explaining an operation when a charging device according to an embodiment supplies power to a single phase load in a reverse direction.

FIG. 9 illustrates a drawing for explaining an operation when a charging device according to an embodiment supplies power to a single phase load in a reverse direction.

In FIG. 9, only components for explaining an operation of supplying power to a single phase load in a reverse direction are shown. Only the connection state of each of the plurality of relays 71 to 76 is shown, and the plurality of lines 61 to 66 and 91 to 96 and the relay filter circuit are not shown. However, the relay filter circuit for filtering the noise generated in the plurality of lines 61 to 66, 91 to 96, and 81 to 83 may also be applied to the embodiment of FIG. 9.

A single phase load 60 may be implemented as one of a resistor, an inductor, and a capacitor, or a combination of at least two thereof. Compared with FIG. 1, the same reference numerals are denoted for the same components, and duplicate descriptions will be omitted below.

The relay control circuit 3 may sense a load connected to the plurality of input terminals IN1 to IN3 to determine whether the load is a three-phase load or a single-phase load. When the load connected to the plurality of input terminals IN1 to IN3 is a single phase load, the relay control circuit 3 may generate the relay control signals RS1, RS4, and RS6 for turning on the plurality of relays 71, 74, and 76 and the relay control signal RS2 and RS3 for turning off the plurality of relays 72 and 73 to supply them to the plurality of relays 71 to 76. In this case, the relay control circuit 3 may generate a phase sensing signal SL indicating the single-phase together to transmit it to the power control circuit 4. The relay control circuit 3 turns on the relay 75 at a time point when a predetermined period has elapsed from the start of the reverse charging operation.

The method in which power is supplied to the PFC circuit 20 through the power converting circuit 30 is omitted because it is the same as the previously described embodiment in which the three-phase load is connected. Hereinafter, the operation of the PFC circuit 20 in the embodiment in which the single-phase load 60 is connected thereto will be described with reference to FIG. 10. As shown in FIG. 10, the PFC circuit 20 operates as a single-phase inverter.

Figure 10:
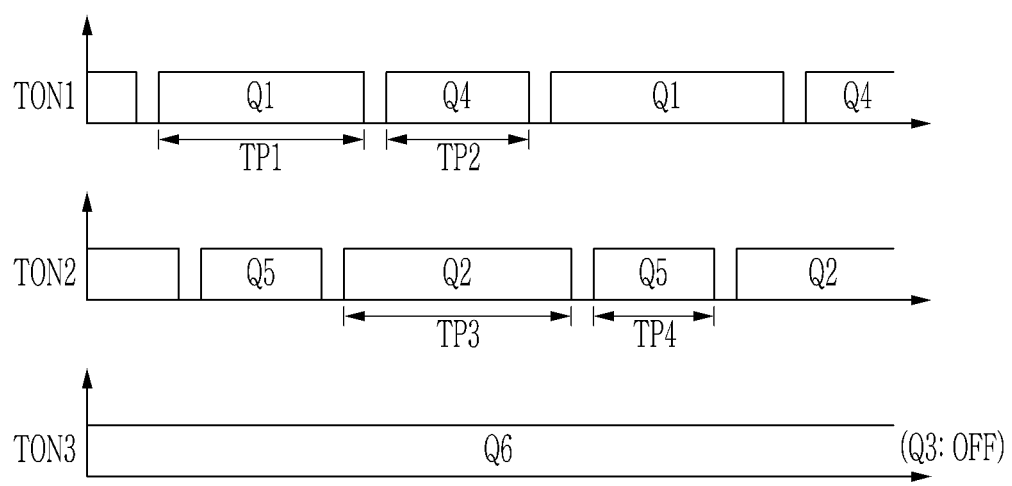
FIG. 10 illustrates a switching operation of a PFC circuit according to an embodiment.

FIG. 10 illustrates a switching operation of a PFC circuit according to an embodiment.

As shown in FIG. 10, an on-state switch among the switches Q1 and Q4 of the first switch leg 21 is shown in a "TON1" waveform diagram, an on-state switch among the switches Q2 and Q5 of the second switch leg 22 is shown in a "TON2" waveform diagram, and an on-state switch among the switches Q3 and Q6 of the third switch leg 23 is shown in a "TON3" waveform diagram. In the single-phase load condition, the switch Q3 of the third switch leg 23 is turned off, and the switch Q6 thereof is turned on.

During a period TP1 when the switch Q1 is turned on and the switch Q4 is turned off in the first switch leg 21, a current flows in the inductor 25 by the input voltage charged in the PFC link capacitor 24. The current of the inductor 25 flows through the load 60, the relay 76, and the switch Q6, and power is supplied to the load 60. Subsequently, during the period TP2 in which the switch Q1 is turned off and the switch Q4 is turned on in the first switch leg 21, the current of the inductor 25 flows through the relay 76, the switch Q6, and the switch Q4. Between the periods TP1 and TP2, there is a dead time in which both switches Q1 and Q4 are turned off.

During a period TP3 in which the switch Q2 is turned on and the switch Q5 is turned off in the second switch leg 22, a current flows in the inductor 26 by the input voltage charged in the PFC link capacitor 24. The current of the inductor 26 flows through the load 60, the relay 76, and the switch Q6, and power is supplied to the load 60. Subsequently, during a period TP4 in which the switch Q4 is turned off and the switch Q2 is turned on in the second switch leg 22, the current of the inductor 25 flows through the relay 76, the switch Q6, and the switch Q4. Between the periods TP3 and TP4, there is a dead time in which both switches Q2 and Q5 are turned off.

The charging device 1 according to the embodiments described above may supply power from the battery 40 to the load. The charging device 1 according to the embodiments may be applied to an electric vehicle, and the battery 40 supplies electric power required to operate the electric vehicle.

Charging is possible regardless of the rated voltage of the battery through the charging device according to the embodiment. In addition, the charging device may supply power from the battery to the load (vehicle to load, V2L) or from the battery to the grid (vehicle to grid, V2G). In addition, since a frequency variable range of the charging device is narrow compared to an operating frequency range of the LLC converter, the transformer may be down-sized. In the PFC circuit according to the embodiment, a current stress applied to the switch of the PFC circuit is constant regardless of a step-up ratio. Therefore, the charging device according to the embodiment may be implemented in a high step-up ratio.

Particularly, in the V2G implementation, the link voltage variable method is applied to the charging device, so that the output voltage range that may be supplied to the grid is very wide. In addition, the resonant gain of the LLC converter does not change because the turn ratio is substantially the same in the reverse power supplying and the forward power supplying. In the reverse direction power supplying, power of 380 V or higher may be supplied without a separate converter at the load side.

In addition, the relay filter circuit according to an embodiment may reduce the low voltage noise.

Figure 11:
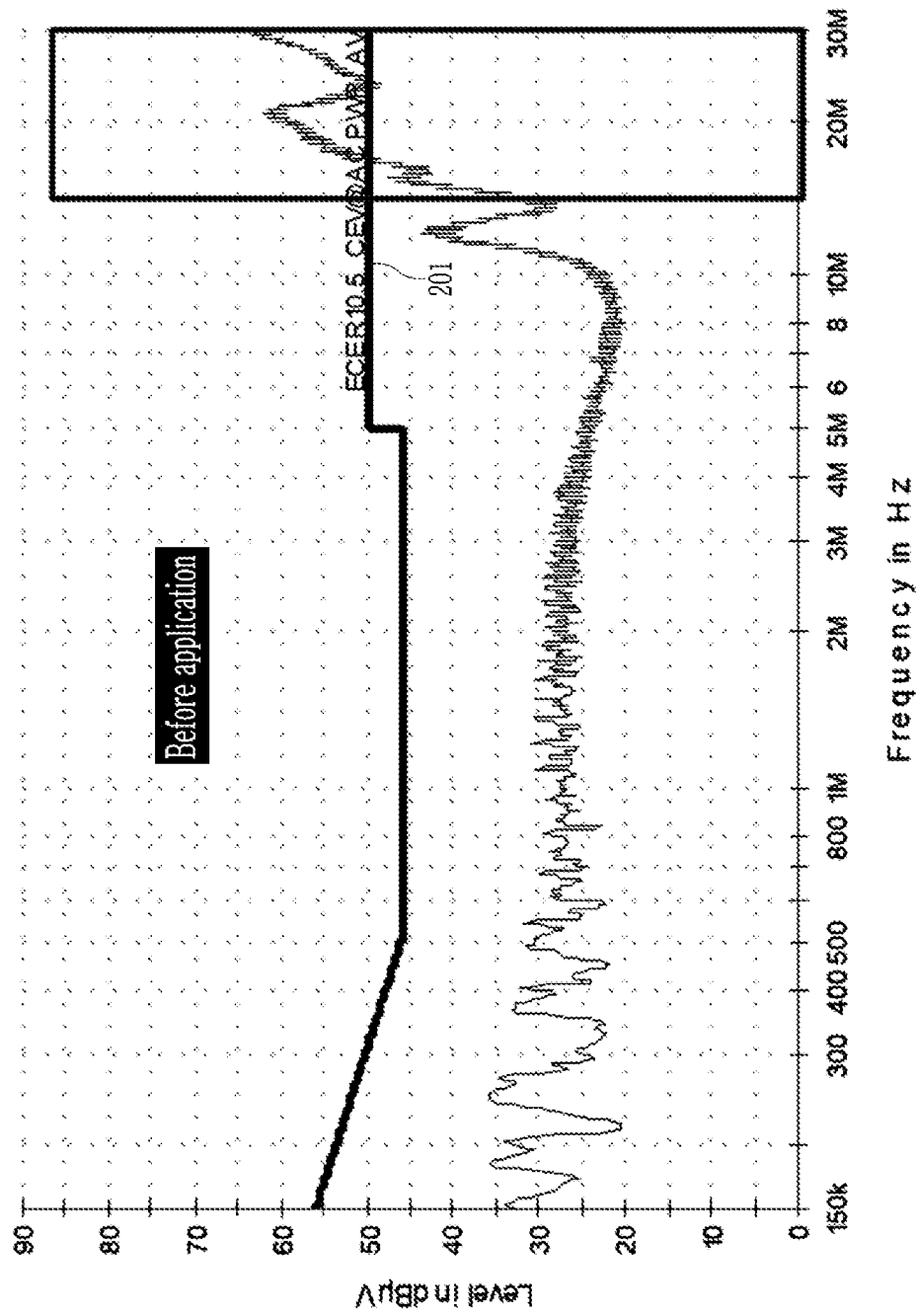
FIG. 11 illustrates a spectrum of an EMI level of an input terminal in a charging device to which a relay filter circuit according to an embodiment is not applied.

FIG. 11 illustrates a spectrum of an EMI level of an input terminal in a charging device to which a relay filter circuit according to an embodiment is not applied.

Figure 12:
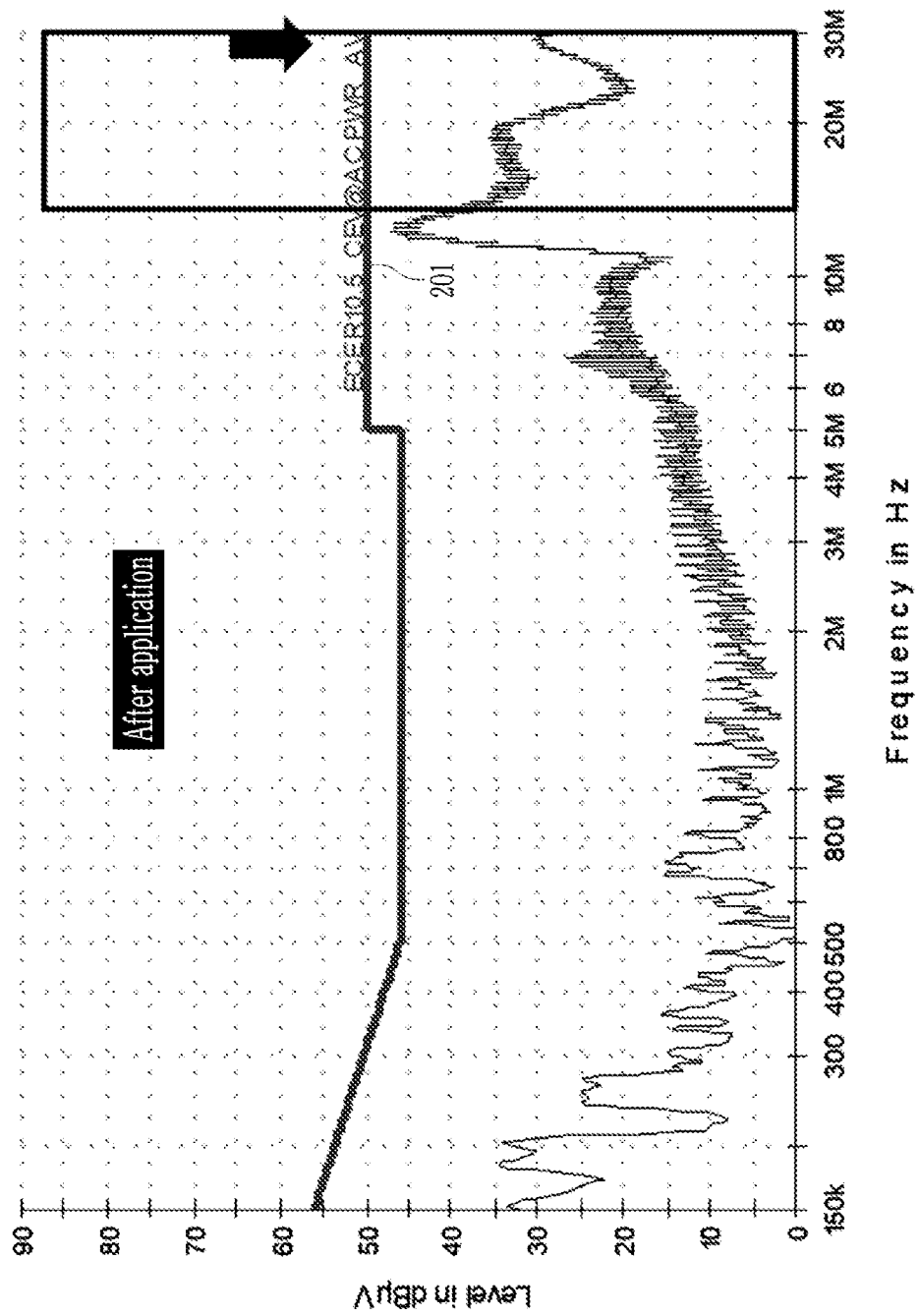
FIG. 12 illustrates a spectrum of an EMI level of an input terminal in a charging device to which a relay filter circuit according to an embodiment is applied.

FIG. 12 illustrates a spectrum of an EMI level of an input terminal in a charging device to which a relay filter circuit according to an embodiment is applied.

In FIG. 11 and FIG. 12, a line 201 indicates an EMI level regulation value defined in the ECE-R10 electromagnetic compatibility (EMC) regulation. Electronic devices connected to the AC power system may be sold only when they satisfy the ECE-R10 EMC regulation. Specifically, the line 201 in FIG. 11 and FIG. 12 indicates average regulation values for the EMI level.

Compared with the EMI level shown in FIG. 11, it can be confirmed that the EMI level of the 15 to 30 MHz high frequency band shown in FIG. 12 is reduced by up to 30 dB in a portion indicated by an arrow. That is, it can be seen that, according to the embodiment, the noise in the high frequency band emitted to an input terminal by the parasitic capacitance between the line necessary for sensing the AC commercial power source or load, the lines for driving the relays, and the power line is reduced. Accordingly, it is possible to suppress the noise from being emitted to the AC commercial power source or load through the input terminal.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A charging device comprising:
a power factor correction (PFC) circuit comprising first, second, and third inductors and first, second, and third switch legs connected to the first, second, and third inductors, respectively;
a relay network configured to control connection between the first, second, and third inductors and first, second, and third input terminals according to a phase of a power grid connected to the first, second, and third input terminals;
a relay control circuit connected to the first, second, and third input terminals and configured to sense one of the first, second, and third input terminals to which a power source is connected and to control the relay network based on a sensing result; and
a relay filter circuit comprising:
first, second, and third filter capacitors connected between a ground plane and first, second, and third sensing lines connected to the relay control circuit and configured to sense voltages of the first, second, and third input terminals; and
a fourth filter capacitor connected between the ground plane and a chassis.

2. The charging device of claim 1, wherein the relay network comprises:
a first relay comprising a first end connected to the first input terminal and the first inductor and a second end connected to the second input terminal and the second inductor;
a second relay connected between the second input terminal and the second inductor;
a third relay connected between the third input terminal and the third inductor;
a fourth relay connected between a neutral point with respect to the first, second, and third input terminals and the third inductor; and
a fifth relay connected in parallel to the third inductor.

3. The charging device of claim 2, wherein:
the relay filter circuit further comprises a fifth filter capacitor and a sixth filter capacitor respectively connected between the ground plane, a first power line connected between the relay control circuit and at least one of the first, second, third, fourth, or fifth relays, and a first control line; and the at least one relay is configured to receive a power voltage through the first power line; and an operation of the at least one relay is controllable by a relay control signal supplied through the first control line.

4. The charging device of claim 2, wherein:

when the first, second, and third input terminals are connected to respective phases of a three-phase power source, the relay network connects each of the phases of the three-phase power source to a corresponding one of the first, second, and third switch legs, and the PFC circuit is configured to operate as a three-phase boost PFC; and when a single-phase power source is connected to one of the first, second, and third input terminals, the relay network connects the single-phase power source to the first and second switch legs and connects the third switch leg to the neutral point, and the PFC circuit is configured to operate as a single inductor type of interleaved single-phase full-bridge PFC.

5. The charging device of claim 4, wherein, when the first, second, and third input terminals are connected to respective phases of the three-phase power source, the first relay, the fourth relay, and the fifth relay are turned off, and the second relay and the third relay are turned on.

6. The charging device of claim 4, wherein, when the single-phase power source is connected to the first input terminal, the first relay, the fourth relay, and the fifth relay are turned on, and the second relay and the third relay are turned off.

7. The charging device of claim 2, further comprising a power converting circuit connected between the PFC circuit and a battery and configured to transmit power from the PFC circuit to the battery.

8. The charging device of claim 7, wherein:

the first switch leg comprises a first switch connected between the first inductor and a first input terminal of the power converting circuit and a second switch connected between the first inductor and a second input terminal of the power converting circuit;

the second switch leg comprises a third switch connected between the second inductor and the first input terminal of the power converting circuit and a fourth switch connected between the second inductor and the second input terminal of the power converting circuit; and the third switch leg comprises a fifth switch connected between the third inductor and the first input terminal of the power converting circuit and a sixth switch connected between the third inductor and the second input terminal of the power converting circuit.

9. The charging device of claim 8, wherein, in a state in which a single-phase power source is connected to the first input terminal:

the first relay, the fourth relay, and the fifth relay are turned on, and the second relay and the third relay are turned off;

during a period in which a single-phase power supply has a positive voltage, a period in which the first switch, the third switch, and the sixth switch are turned on and a period in which the second switch, the fourth switch, and the sixth switch are turned on are repeated; and during a period in which the single-phase power supply has a negative voltage, a period in which the second switch, the fourth switch, and the fifth switch are turned on and a period in which the first switch, the third switch, and the fifth switch are turned on are repeated.

10. The charging device of claim 2, wherein:

the relay network further comprises a sixth relay connected in parallel to a resistor connected between the first input terminal and the first inductor; and the charging device is configured to turn on the sixth relay after a peak of a voltage inputted to the PFC circuit.

11. The charging device of claim 1, wherein the relay control circuit comprises:

a sensing part configured to sense voltages of the first, second, and third input terminals through the first, second, and third sensing lines and to generate three sensing signals indicating the sensed voltages;

a controller configured to receive the three sensing signals, to determine a phase of a power system connected to the first, second, and third input terminals, and to generate a phase sensing signal indicating the determined phase;

a power supplier configured to supply a power voltage to the relay network according to the phase sensing signal; and a switching driver configured to supply a relay control signal to the relay network according to the phase sensing signal.

12. A charging device comprising:

a power factor correction (PFC) circuit comprising first, second, and third inductors and first, second, and third switch legs connected to the first, second, and third inductors, respectively;

a relay network configured to control connection between the first, second, and third inductors and first, second, and third input terminals according to a phase of a power grid connected to the first, second, and third input terminals, wherein the relay network comprises:

a first relay comprising a first end connected to the first input terminal and the first inductor and a second end connected to the second input terminal and the second inductor;

a second relay connected between the second input terminal and the second inductor;

a third relay connected between the third input terminal and the third inductor;

a fourth relay connected between a neutral point with respect to the first, second, and third input terminals and the third inductor; and a fifth relay connected in parallel to the third inductor;

a relay control circuit connected to the first, second, and third input terminals and configured to sense one of the first, second, and third input terminals to which a power source is connected and to control the relay network based on a sensing result; and a relay filter circuit comprising:

first, second, and third filter capacitors connected between a ground plane and first, second, and third sensing lines connected to the relay control circuit and configured to sense voltages of the first, second, and third input terminals; and a fourth filter capacitor connected between the ground plane and a chassis;

wherein, when the first, second, and third input terminals are connected to respective phases of a three-phase load, the relay network connects each of the phases of a three-phase power source to a corresponding one of the first, second, and third switch legs, and the PFC circuit is configured to operate as a three-phase inverter; and wherein, when a single-phase load is connected to one of the first, second, and third input terminals, the relay network connects the single-phase load to the first and second switch legs and connects the third switch leg to the neutral point, and the PFC circuit is configured to operate as a single-phase inverter.

13. The charging device of claim 12, wherein, when the first, second, and third input terminals are connected to respective phases of the three-phase load, the first relay, the fourth relay, and the fifth relay are turned off, and the second relay and the third relay are turned on.

14. The charging device of claim 12, wherein, when the single-phase load is connected to the first input terminal, the first relay, the fourth relay, and the fifth relay are turned on, and the second relay and the third relay are turned off.

15. The charging device of claim 12, wherein the relay control circuit is configured to sense an input terminal to which the three-phase load or the single-phase load is connected among the first, second, and third input terminals and to control the relay network.

16. The charging device of claim 12, further comprising a power converting circuit connected between the PFC circuit and a battery and configured to transmit power from the battery to the PFC circuit.

17. The charging device of claim 16, wherein:
the first switch leg comprises a first switch connected between the first inductor and a first input terminal of the power converting circuit and a second switch connected between the first inductor and a second input terminal of the power converting circuit;
the second switch leg comprises a third switch connected between the second inductor and the first input terminal of the power converting circuit and a fourth switch connected between the second inductor and the second input terminal of the power converting circuit; and
the third switch leg comprises a fifth switch connected between the third inductor and the first input terminal of the power converting circuit and a sixth switch connected between the third inductor and the second input terminal of the power converting circuit.

18. The charging device of claim 17, wherein, when the single-phase load is connected to the first input terminal:
the first relay, the fourth relay, and the fifth relay are turned on, and the second relay and the third relay are turned off;
the first switch and the second switch are alternately switched, the third switch and the fourth switch are alternately switched, an on period of the fourth switch entirely overlaps an on period of the first switch, and an on period of the second switch entirely overlaps an on period of the third switch; and
the fifth switch is turned off, and the sixth switch is turned on.

19. A method of providing a charging device, the method comprising:
providing a power factor correction (PFC) circuit comprising first, second, and third inductors and first, second, and third switch legs connected to the first, second, and third inductors, respectively;
providing a relay network that controls connection between the first, second, and third inductors and first, second, and third input terminals according to a phase of a power grid connected to the first, second, and third input terminals;
providing a relay control circuit connected to the first, second, and third input terminals that senses one of the first, second, and third input terminals to which a power source is connected and controls the relay network based on a sensing result; and
providing a relay filter circuit comprising:
first, second, and third filter capacitors connected between a ground plane and first, second, and third sensing lines connected to the relay control circuit to sense voltages of the first, second, and third input terminals; and
a fourth filter capacitor connected between the ground plane and a chassis.

20. The method of claim 19, wherein the relay network comprises:
a first relay comprising a first end connected to the first input terminal and the first inductor and a second end connected to the second input terminal and the second inductor;
a second relay connected between the second input terminal and the second inductor;
a third relay connected between the third input terminal and the third inductor;
a fourth relay connected between a neutral point with respect to the first, second, and third input terminals and the third inductor; and
a fifth relay connected in parallel to the third inductor.

* * * * *